(12) United States Patent
Gopinath

(10) Patent No.: US 9,702,731 B2
(45) Date of Patent: Jul. 11, 2017

(54) SYSTEM FOR MEASURING AND REPORTING RESOURCE USAGE

(71) Applicant: Sunil Gopinath, Trivandrum, Kerala (IN)

(72) Inventor: Sunil Gopinath, Trivandrum (IN)

( * ) Notice: Subject to any disclaimer, the term of this patent is extended or adjusted under 35 U.S.C. 154(b) by 133 days.

(21) Appl. No.: 14/767,307

(22) PCT Filed: Feb. 20, 2014

(86) PCT No.: PCT/IN2014/000108
§ 371 (c)(1),
(2) Date: Aug. 12, 2015

(87) PCT Pub. No.: WO2014/128725
PCT Pub. Date: Aug. 28, 2014

(65) Prior Publication Data
US 2016/0011007 A1    Jan. 14, 2016

(30) Foreign Application Priority Data
Feb. 20, 2013  (IN) .............................. 741/CHE/2013

(51) Int. Cl.
| G06F 17/30 | (2006.01) |
| G06F 1/26 | (2006.01) |
| G01D 4/00 | (2006.01) |

(52) U.S. Cl.
CPC ............ *G01D 4/002* (2013.01); *G01D 4/004* (2013.01); *Y02B 90/242* (2013.01); *Y04S 20/322* (2013.01)

(58) Field of Classification Search
CPC .............................. G01D 4/002; G01D 4/004
See application file for complete search history.

(56) References Cited

U.S. PATENT DOCUMENTS

| 5,594,740 | A | 1/1997 | LaDue |
| 5,831,550 | A | 11/1998 | Sigiliao Da Costa et al. |
| 6,088,659 | A | 7/2000 | Kelley et al. |
| 6,633,823 | B2 | 10/2003 | Bartone et al. |
| 6,867,707 | B1 | 3/2005 | Kelley et al. |
| 7,671,480 | B2 | 3/2010 | Pitchford et al. |
| 7,746,246 | B2 | 6/2010 | Salser, Jr. |
| 7,880,641 | B2 | 2/2011 | Parris et al. |
| 7,890,436 | B2 | 2/2011 | Kremen |
| 8,055,461 | B2 | 11/2011 | Stuber et al. |
| 8,164,479 | B2 | 4/2012 | Osterloh et al. |
| 8,183,995 | B2 | 5/2012 | Wang et al. |
| 8,212,687 | B2 | 7/2012 | Makinson et al. |
| 8,242,931 | B2 | 8/2012 | Holman et al. |

(Continued)

*Primary Examiner* — Joseph Feild
*Assistant Examiner* — Pameshanand Mahase
(74) *Attorney, Agent, or Firm* — Alan D. Kamrath; Kamrath IP Lawfirm, P.A.

(57) ABSTRACT

A system and method for measuring and reporting the renewable and non-renewable resources usage in an automated manner is provided. The system includes an AMI Meter for measuring resources usage and communicates to an AMI Server through multiple inbuilt communication facility. The AMI Server stores and process the data received from the AMI Meter for producing billing and control information. The informational messages are sent to the corresponding consumer AMI Meters and get updated in payment nodes by the AMI Server. The AMI Meter is also facilitated with auto registration (registering with server) and bi-directional metering features.

20 Claims, 3 Drawing Sheets illustrates the complete automated system for measuring and reporting resource usage.

(56) References Cited

U.S. PATENT DOCUMENTS

| | | |
|---|---|---|
| 8,271,336 B2 | 9/2012 | Mikurak |
| 8,294,568 B2 | 10/2012 | Barrett |
| 8,310,341 B2 | 11/2012 | Cornwall et al. |
| 8,325,057 B2 | 12/2012 | Salter |
| 8,325,060 B2 | 12/2012 | Flammer, III |
| 8,896,461 B2 | 11/2014 | Angelis et al. |
| 9,000,945 B2 | 4/2015 | Sobotka et al. |
| 9,018,939 B2 | 4/2015 | Sobotka et al. |
| 2003/0195860 A1 | 10/2003 | Ball |
| 2004/0225648 A1* | 11/2004 | Ransom ................ G01D 4/004 |
| 2008/0281473 A1* | 11/2008 | Pitt ..................... G06Q 30/02 700/291 |
| 2009/0267792 A1* | 10/2009 | Crichlow ............... G01D 4/004 340/870.02 |
| 2011/0137763 A1* | 6/2011 | Aguilar ................ G06Q 30/018 705/30 |
| 2011/0273305 A1 | 11/2011 | Osterloh et al. |
| 2012/0019395 A1 | 1/2012 | Willig et al. |
| 2012/0072033 A1 | 3/2012 | Imes et al. |
| 2012/0126994 A1 | 5/2012 | Sobotka et al. |
| 2012/0198551 A1 | 8/2012 | Whitney |
| 2012/0268291 A1 | 10/2012 | Boot et al. |
| 2015/0185046 A1 | 7/2015 | Sobotka et al. |
| 2015/0212122 A1 | 7/2015 | Sobotka et al. |

* cited by examiner

Figure 1: AMI Server
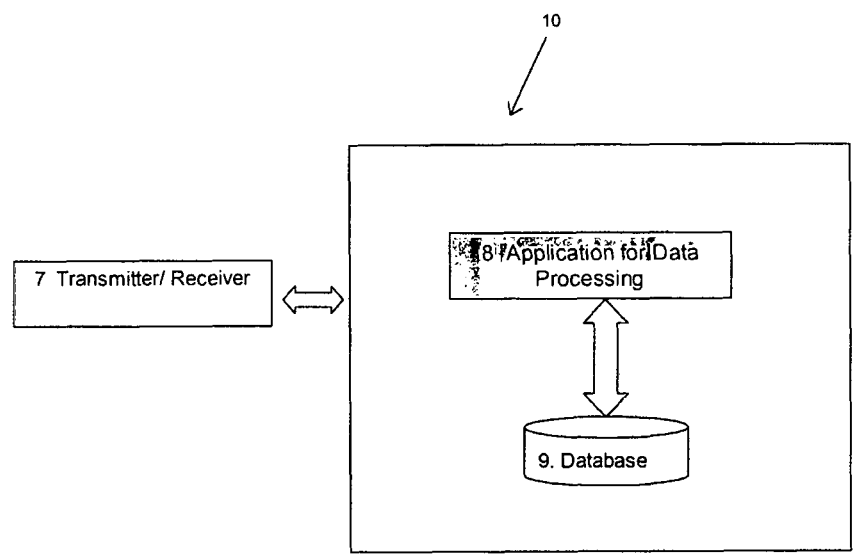

Figure 2 illustrates the structure and components of the AMI Meter
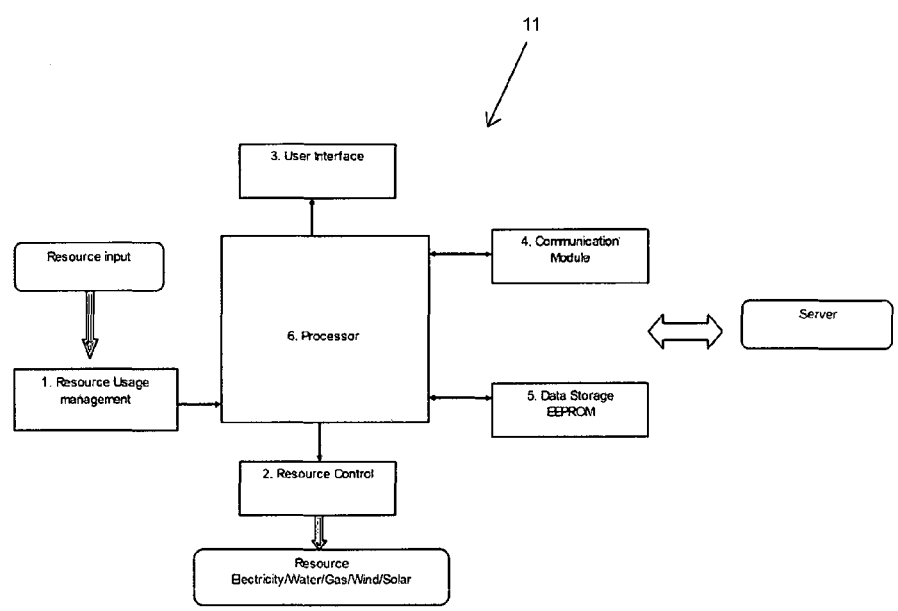

Figure 3 illustrates the complete automated system for measuring and reporting resource usage.
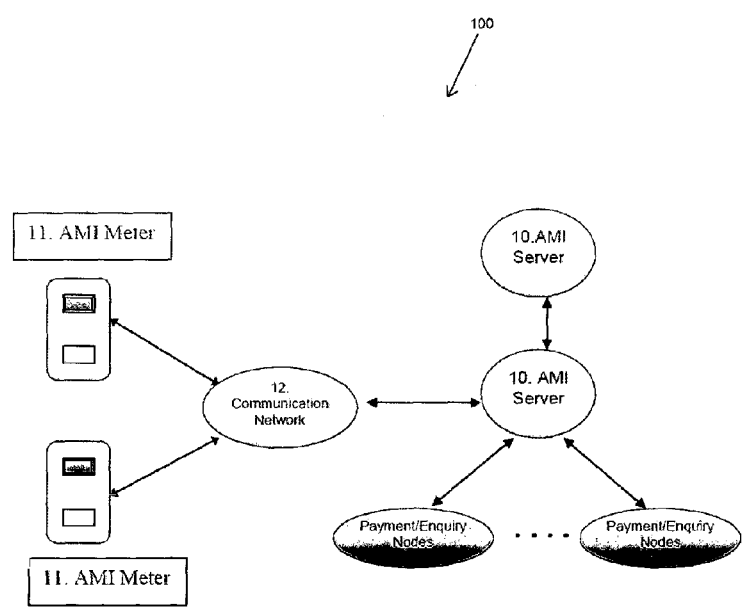

SYSTEM FOR MEASURING AND REPORTING RESOURCE USAGE

FIELD OF THE INVENTION

The present invention generally relates to energy resource management system. More particularly, it relates to a system for automatic meter reading and reporting the generation and consumption of renewable and nonrenewable energy resources.

BACKGROUND OF THE INVENTION

Any consumable energy including electricity, water, gas etc, has to be measured for the purpose of billing. Traditionally energy consumed is measured using mechanical meters. Due to the rapid increase in the number of consumers, the requirement has gone up and data collection for the purpose of billing has raised lot of concerns. So the idea of automation came by way of using radio frequency techniques, drive way systems etc. for the purpose of data transmission. This type of automated meters offers the benefits of improved reliability, accuracy, security along with advanced billing features. These automated meters offer energy consumers the opportunity to manage their energy usage in a better way.

Though Automated Meter Reading (AMR) systems are known in prior art, they provide only partial automation/require manual intervention. The commonly used AMR systems include: (1) AMR using a handheld device to retrieve the data from an energy meter with similar facility to deliver data to the device. In this case, a meter reader carries a handheld device with a built-in or attached receiver/transceiver (radio frequency or touch) to collect meter readings from an AMR capable meter. Manual intervention is very much needed in this case and delay in data collection and processing is still the same when compared with the ordinary mechanical meter. (2) Another mode of automation is the drive-way system wherein a vehicle fitted with the necessary mechanism will be driven through the street and the meters fixed at the consumer premises will send the data to this device. This method is successful only in well planned cities and very rarely used. (3) In data concentrator AMR, all the meters send data to a common device called data concentrator through the same Power line and from there to the central server using modems/dialup up techniques.

A further limitation of the conventional AMR system is that they do not accommodate the requirements of end-user systems (e.g., billing systems, energy management systems and supervisory control systems). These systems are typically standalone systems/add on, separate from the metering system. One of the primary reasons that the requirements of end-user systems are not met is because of the above-mentioned limitations. Conventional AMR systems were designed as proprietary systems rather than open systems. Open protocol has been developed and all meter manufactures have started using the set protocol. However, a lot of issues relating to automation are still continuing. Conventional AMR systems do not perform validation, editing and estimation of the output data, and require a relatively high amount of manual intervention to transfer data from the AMR system to end users for further processing. Also the ownership of the metes and the software applications lie with different group/companies. After sales, services are mom complex and difficult.

As a next step, Advanced Metering Infrastructure (AMI) systems have been introduced for providing two way communications between the meter and the server. The AMI systems have gained interest because conventional AMR systems typically use only one type of communication infrastructure to transfer data and so it becomes costly and labour intensive to collect data from many meters due to their distributed location.

U.S. Pat. Nos. 8,183,995 and 7,890,436 disclose systems and/or methods for measuring the energy resources like wind, solar using automatic meter reading. The data collected by the metering system is communicated through either one of the communication mediums such as GPRS, EDGE, etc.

U.S. Pat. Nos. 6,867,707, 5,594,740, 7,880,641, 8,294,568, 6,088,659, 8,164,479 and U.S. Patent Application No. 20120072033 disclose systems which include bi-directional or unidirectional/Automatic Meter Reading with AMI using various communication protocols and mediums like GSM, GPRS and Wi-Fi for data communication. It either include technologies like GPS, GIS for reporting location/timing synchronization or support cross platform.

U.S. Pat. Nos. 8,325,057, 8,055,461, 8,212,687, 8,325,060, 8,271,336, 7,746,246, 7,671,480, 8,310,341, 8,242,931 and U.S. Patent Application Nos. 2011273305, 20120019395 deal with automatic metering systems to measure the energy consumption and communicate through one of the technologies like CDMA, Wi-Fi, GSM, GPRS, PSTN and PLC etc. and various wireless protocols are used for communications.

Existing methods discussed in the prior art have one or more drawbacks such as (1) meter without inbuilt bi-directional communication options, (2) no auto registration facilities (3) no bi-directional metering or net metering with inbuilt multiple bi-directional communication options (4) no post payment and prepayment metering using the same meter (5) no server application which does support all available computer operating systems (6) Communication lacks in unique communication protocol using advanced compression techniques and security (7) dependencies for data transfer is very Complex (8) no system capable of sending information like payment details, payment last date remainder etc., to consumers mobile phone or secondary display automatically in human readable format.

Hence, there is a need for an entire and efficient resource management system to overcome the above mentioned limitations. Thus the system of the present invention provides a clear, fast, precise and transparent resource management solution in a fully automated manner.

SUMMARY OF THE INVENTION

This invention relates to an improved system for automatic metering and reporting the generation and consumption of renewable and non-renewable energy resources. The system comprises the following components: An AMI Meter with inbuilt multiple bi directional communication facility, auto registering and bi-directional/net metering facility, An AMI Server with necessary software/hardware capable of sending/receiving data from AMI Meter, and a communication medium for data transmission. The AMI Meter possesses auto registration facility with the AMI Server which makes the meter installation process easy. The AMI Meter measures the usage of resources and communicates to the AMI Server as per set intervals through various inbuilt communication options like GSM, CDMA, GPRS, Wi-Fi, LPRF, PLC, LAN etc. The AMI Meter also stores the data as a back up in the meter itself. The AMI Meter also supports bi-directional/net metering and it includes storage for various operational states.

The AMI Server supports cross platform inter-operability and performs data processing and stores the usage and operational details received from the AMI Meter. Based on the processing result, the AMI Server sends the control and the information messages to the AMI Meter which is displayed in the user interface. Billing and payment details are sent to the payment node using a unique data compression technique to attain lower storage requirements and encryption facility to ensure security. The payment node is used to lookup consumer's data and their associated bills. Once the payment is made, this information is updated at the central database. The AMI Server also supports inter server communications to keep the data synchronized amongst them.

BRIEF DESCRIPTION OF THE DRAWINGS

The objective of the present invention will now be described in more detail with reference to the accompanying drawings, in which:

FIG. 1 illustrates the structure and components of the AMI Server;

FIG. 2 illustrates the structure and components of the AMI Meter;

FIG. 3 illustrates the complete automated system for measuring and reporting resource usage.

DEFINITIONS AND ACRONYMS

AMI—Automatic Metering Infrastructure
AMR—Automatic Meter Reading
CDMA—Code Division Multiple Access
EDGE—Enhanced Data rates for GSM Evolution
EEPROM—Electrically Erasable Programmable Read Only Memory
GIS—Geographic Information System
GPRS—General Packet Radio Service
GPS—Global Positioning System
GSM—Global System for Mobile communication
LPRF—Low Power radio Frequency
LAN—Local Area Network
PLC—Power Line Communication
PSTN—Public Switched Telephone Network
TCP/IP—Transmission Control Protocol/Internet Protocol
Wi-Fi—Wireless Fidelity
Resource
Any measurable form of energy such as Electricity, Water, Gas and also renewable electrical energy generated from wind, solar, sea wave etc. or any flowing fluid can be termed as an Energy Resource
Provider
A Provider is an individual or a group of individuals or a State Agency who produces and distributes Energy resource.
Consumer
An individual or a set of individuals who consumes the Energy Resource that is distributed by a Provider.
Distribution Network
A network represents a group of customers consuming the resource supplied by a provider. Consumers shall possess an AMI Meter (11) for measuring their resource consumption. All the Meters in a network communicate the consumption details with AMI Server/servers (10) possessed by the Provider.

DETAILED DESCRIPTION OF THE INVENTION

The present invention relates to a system (100) for measuring and reporting resource usage of renewable and non-renewable energy. It comprises components such as AMI Meter (11), AMI Server (10), payment node and communication medium to constitute a complete system for an automated metering. It supports fully automated resource management system by encompassing facilities such as auto registration, inbuilt bi directional multiple communication channels, unique protocol for secure and safe transmission, and cross platform interoperability, post-paid and prepaid metering using the same AMI meter, and provision for bi-directional/net metering.

Referring to the invention in detail, FIG. 2 illustrates structure of the AMI meter (11). It comprises the following:

1. Resource Usage Measurement

It is a hardware component that measures and calculates resource usage.

2. Resource Control

This is a module that controls the resource usage. The Provider, if desired can disconnect or reconnect the resource to the consumer site.

3. User Interface
   i. The first component is the user interface (3) in built with the meter enabling accurate data stored, analyzed and presented to a customer on demand. Tracking the real-time consumption on a day to day basis in the most cost effective way to identify energy usage coupled with analysis that can help both utility and customer. The user interface (3) consists of a module to enable the consumer to interact with the AMI Meter (11). The visual section displays measurement and reporting information. It also displays the real-time usage, billing information and any AMI Server (10) originated or local messages, e.g., faults, over usage, bill overdue information. Input section allows the user to control user-interface related activities, e.g., scroll messages, view stored messages, view operational parameters.
   ii. The second component is in addition to inbuilt user interface (3), there will a secondary interface which performs all the functionalities of the inbuilt one. This secondary interface will be kept inside the customer's premises for easy access of the details of meter and the consumption pattern and other information pertaining to consumption and other server generated contents.

4. Communication Module

This module provides a communication channel between the AMI Meter (11) and the AMI Server (10). The communication can occur through the inbuilt communication options like GSM, CDMA, GPRS, WIFI, LPRF, PLC, LAN, LPRF etc.

5. Data Storage

This is a module that stores the data required for the AMI Meter (11). The data consists of configuration and operational information pertaining to the AMI Meter (11), which includes the current reading, messages, provider specific information, meter state and information pertaining to the consumer.

Individual AMI Meters need to store various operational states and should not be susceptible to variations in environment or supply conditions. For example, if an electrical usage reading is recorded, the reading should remain even if the power supply is disconnected. If a consumer is disconnected, the resource should remain disconnected until a reconnect order is issued. To implement this, the AMI Meter

(11) uses proprietary state-management algorithms with the use of hardware and software component.

6. Processor

This is the core component of the AMI Meter (11). It performs the following functionalities with the help of auxiliary modules mentioned in the prior sections.

It receives the resource usage information from the Resource Measurement module (1), and displays this to the consumer using the User interface module (3).

The resource usage information is collected and sent to the AMI Server (10) at periodic intervals using the Communication module (4).

It receives control messages from the AMI Server (10) and acts upon these information.

It receives billing information from the AMI Server (10) and displays it to the user.

It interacts with the user when user uses the input module and performs requested actions.

Downloads any software upgrades and restarts automatically.

FIG. 1 illustrates the AMI Server. The Receiver (7) residing in the AMI Server (10) machine receives from AMI Meter (11) said in FIG. 2. This includes resource Usage information, AMI meter (11) status and other information related to the AMI meter (11) and customer information. The received data is processed by the software application (8) residing in the AMI Server (10) and the processed data is stored in the database (9). The GUI present in the software application (8) is used to control AMI meters shown in FIG. 2. The controlling of the meters can be done automatically or manually. The payment and billing details are updated to the payment node at regular intervals. AMI Server (10) also handles transmission of control and informational tasks through Transmitter (7) i.e. sending billing messages, management data and other content to the associated AMI Meter (11) which is shown in FIG. 2. Some messages are displayed to the user through the user interface (3) that is shown in FIG. 2 while other messages are used to control the AMI Meter (11) activities.

FIG. 3 illustrates the implementation of fully Automated Meter Reading infrastructure methodology using the following components:

One or more AMI Meter (11) which is capable of sending and receiving data

A single or a set of AMI Server machines (10) capable of sending and receiving data with necessary software/hardware to process the data Medium for communication Auxiliary support systems for data management Payment node The whole Automated Meter Reading infrastructure system (100) as shown in FIG. 3 includes a communication network (12) between individual AMI Meters (11) and AMI Servers (10). Communication network (12) consists of a two-way communication between individual AMI Meters (11) and AMI Servers (10). AMI Meter (11) measures the resource usage through its components and communicate the data to the AMI Server (10) through multi inbuilt communication options. Communication can occur in two ways as below.

a) Wired Communication

The AMI meter (11) at each consumer end sends and receives information to/from the AMI Server using the power line itself (PLC) if the resource measured is electricity consumed from the utility or generated for the utility from grid or from wind power or from solar panels. Communication can be done using LAN, telephone lines for other resource including electricity.

b) Communication Using Wireless Technology

The AMI Meter (11) of each Consumer sends and receives information to/from the AMI Server (10) using wireless technology such as GSM, CDMA, GPRS, WIFI, LPRF etc. AMI Server (10) as shown in FIG. 3 performs data processing on details received from AMI Meter (11). Data processing on (10) produces results as control and information messages. Those messages are intercommunicated with various sub-systems of automated metering infrastructure system to exchange data related to its operation through communication network (12) and PLC/LAN (13). This is divided into inter-server communication, communication between AMI Meters and AMI Servers and communication between server and payment node. Any device that participates in the communication is referred to as node in this section. The information passed between each node depends on its function.

Communication between AMI Meter and AMI Server:

The AMI Meter (11) passes usage/generation and operational information/other content to the AMI Server (10) periodically through communication module (4). This message is called as usage message. It intimates the usage, generation and operational/other content of conventional and non-conventional resources to the AMI Server (10).

Communication between AMI Server and Units:

AMI Server (10) of the AMI system communicates with other components of network using various types of messages as listed below:

Generic Message Format

Although the physical channel consists of various methods mentioned in the previous section, the actual content includes, inter alia the following.

Types of Message a) Initialization Message

This message, inter alia, is used to auto-register the AMI Meter (11) and set basic parameters on the AMI Server (10) and the AMI Meter (11). This information contains consumer information, meter location and meter parameters. Once set, the AMI Server (10) can monitor and manage data from the AMI meters (11).

b) Control Message

This message, inter alia, is sent from the AMI Server (10) to control the AMI Meters (11). This is received by the processor (6) which is shown in FIG. 2 of the AMI Meter (11) for controlling the meter activities. Control messages are produced based on the data received from meters (11).

c) Informational Message

This message, inter alia, is sent from the AMI Server (10) to the AMI Meter (11) and used to display information to the consumer through user interface module (3) which is shown in FIG. 2. Examples of informational messages are fault, over usage, bill overdue information, etc.

Messages Between AMI Server and Payment Nodes

The AMI Server (10) passes billing and payment information to the payment machines. Data exchange between the AMI Server (10) and payment nodes are implemented using widely available TCP/IP. Using a secure channel or LAN connection (13) is established between each AMI Server (10) and payment nodes. The payment node is used to lookup consumer's data and their associated bills. Once the payment is made, this information is updated at the central database (9).

Central database (9) is a server machine that stores all data pertaining to consumers, units, billing, usage and payment. All servers and payment nodes are connected to the database (9) to manipulate data related to the role. For example, the payment node will process billing and payment information.
Inter Server Messages The AMI Server (10) communicates measurement updates with the other AMI Servers at preconfigured intervals. The inter server information exchange keeps the data synchronized and load balanced amongst them.

The advantages of the present invention are:
(a) Advanced Metering Infrastructure with inbuilt communication facility
(b) Communication using different communication medium like GSM, CDMA, GPRS, WIFI, LPRF, PLC, LAN etc.
(c) Cross platform interoperability of server and meter
(d) Meter with capacity for bi-directional/net metering with all the above said facilities.
(e) Complete solution which includes all necessary components for resource measurement and management, storage, communication and data processing
(f) Meter with auto registration facility (registering with the server) for easy and simplified process of installation
(g) AMI Meters capable of managing Post payment and Prepayment using the same meter and without the utility needing to change the meter.
(h) AMI meters capable of communicating with each other forming a mesh network.
(i) Unique advanced compression techniques for reducing the size of data packets and unique encryption methods.

While this invention has been particularly shown and described with references to preferred embodiments thereof, it will be understood by those skilled in the art that various changes in form and details pay be made therein without departing from the scope of the invention encompassed by the appended claims.

Bi-Directional/Net Metering

The AMI Meter (11) can measure resource usage as well as resource generation simultaneously and communicate the same with the AMI server (10). This happens in case of using this system in non conventional resource measurement like wind mills and in cases where a consumer generates electricity using solar power or any other conventional/non conventional energy source and consumes energy from the power grid. This happens generally in case of the resource being electricity.

The invention claimed is:

1. A complete automated system for measuring and reporting resource usage comprising: a single or a set of bi-directional Advanced Metering Infrastructure (AMI) Meters, wherein said AMI Meter includes (i) a resource usage measuring component, said component calculates the resource usage information, (ii) a resource control unit, said unit controls the resource usage by either disconnecting or reconnecting the resource to the consumer premise, (iii) an user interface, said interface enables the consumer to interact with said AMI Meter, (iv) a communication module, (v) a data storage module, said module stores configuration and operational information data pertaining to said AMI Meter, and (vi) a processor, said processor processes said resource usage and communicates to the consumer through said user interface; a single or a set of AMI Servers, wherein said AMI Server supporting cross platform interoperability includes (i) a transmitter/receiver, said transmitter/receiver sends control and informational messages to said AMI Meter and receives said resource usage information from said AMI Meter, (ii) a software application for processing and controlling the received data and (iii) a database for storing processed consumer related data received from said AMI Meter; a communication medium; an auxiliary support system for data management; a payment node; and where the AMI Meter accepts payment.

2. The system according to claim 1, wherein said AMI Meter provides an inbuilt bi-directional communication channel between said AMI Meter and said AMI Server.

3. The system according to claim 1, wherein said AMI Meter provides inbuilt bi directional communication channels between said AMI Meters.

4. The system according to claim 1, wherein said AMI Meter provides for multiple inbuilt bi directional communication channels between
   I. said AMI Meter and said AMI Server;
   II. between said AMI Meter and another AMI Meter and
   III. simultaneously in the same said AMI meter.

5. The system according to claim 2, wherein said AMI Meter provides inbuilt bi-directional communication systems on networks like GSM, CDMA GPRS, WIFI, PLC, Telephone line, LPRF, and LAN.

6. The system according to claim 2, wherein said AMI meter is capable of performing bi-directional metering/net metering.

7. The system according to claim 6, wherein said AMI meter is capable of sending bi-directional/Net metering data to said AMI Server.

8. The system according to claim 2, wherein said AMI meter is capable of Connecting and disconnecting the resource to the consumer as per the instruction from said AMI Server.

9. The AMI Meter according to claim 1, the same AMI meter can be used as both prepaid and post paid meter without changing the meter.

10. The system according to claim 1, wherein said processor further communicates said resource usage information to said AMI Server through said communication module.

11. The system according to claim 10, wherein said processor receives control information and billing information from said AMI Server.

12. The system according to claim 1, wherein said processor downloads any software upgrades and restarts automatically.

13. The system according to claim 1, wherein said AMI Meter includes an auto-registration facility with said AMI Server.

14. The system according to claim 1, wherein said transmitter/receiver further communicates data to one or more said AMI Server for data synchronization.

15. The system according to claim 1, wherein said transmitter/receiver sends billing and payment details to said payment node through LAN connection with a unique advanced compression techniques and unique encryption methods.

16. The system according to claim 1, wherein said transmitter/receiver sends billing and payment details to consumers communication device such as mobile phone, email, secondary display which is kept inside the customer premises, etc., in human readable format automatically.

17. The system according to claim 1, further transferring data from said AMI Meter to said AMI server and from there on, the consumer can be billed at preset intervals without any manual intervention during the whole process.

18. The system according to claim 1, wherein said software application further processes the stored data to generate billing details.

19. A method for measuring and reporting resource usage using a complete automated system comprising the steps of:

(i) auto registering a single or set of AMI Meters with single or set of AMI Servers in the network (ii) measuring the resource usage information by the resource usage measuring component; (iii) communicating the resource usage information and operational information to said AMI Server via a communication module; (iv) processing the data by software application residing in said AMI Server; (v) storing the processed data in a database; (vi) transmitting control and information messages to said AMI Meter; and updating the data in the payment node through a secure channel, and wherein payment is made at the AMI Meter.

20. The system according to claim 1, wherein said processor receives control information and billing information from said AMI Server.

\* \* \* \* \*